(12) United States Patent
Carey et al.

(10) Patent No.: US 11,756,113 B2
(45) Date of Patent: Sep. 12, 2023

(54) SYSTEMS AND METHODS FOR CONDUCTING PERSON TO PERSON TRANSACTIONS USING REWARD POINTS

(71) Applicant: JPMORGAN CHASE BANK, N.A., New York, NY (US)

(72) Inventors: David Christopher Carey, Middletown, DE (US); Syed Rizwan Ali, Aston, PA (US); Howard Spector, Woolwich, NJ (US); Amit Rajwani, Voorhees, NJ (US); Rajini Kakarla, Bear, DE (US); Tuan Dao, Richardson, TX (US); Ashok Reddy, Newark, DE (US); Mizan Miah, Wilmington, DE (US); Sangameswara Rao Panchomarthi, Bear, DE (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 6 days.

(21) Appl. No.: 17/060,413

(22) Filed: Oct. 1, 2020

(65) Prior Publication Data

US 2021/0125273 A1 Apr. 29, 2021

Related U.S. Application Data

(60) Provisional application No. 62/924,916, filed on Oct. 23, 2019.

(51) Int. Cl.
*G06Q 30/00* (2023.01)
*G06Q 40/02* (2023.01)
(Continued)

(52) U.S. Cl.
CPC ......... *G06Q 40/02* (2013.01); *G06F 16/9535* (2019.01); *G06Q 20/023* (2013.01);
(Continued)

(58) Field of Classification Search
None
See application file for complete search history.

(56) References Cited

U.S. PATENT DOCUMENTS 9,384,476 B2 * 7/2016 Hanna ............... G06Q 20/12
10,580,028 B1 * 3/2020 Williams ........... G06Q 30/0233
(Continued)

FOREIGN PATENT DOCUMENTS

WO WO2013043037 * 3/2013 ............ G06F 17/00
WO WO-2013043037 A1 * 3/2013 ......... G06Q 20/3278
(Continued)

OTHER PUBLICATIONS

International Search Report, dated Dec. 8, 2020, from corresponding International Application No. PCT/US2020/054203.
(Continued)

*Primary Examiner* — Luis A Brown
(74) *Attorney, Agent, or Firm* — GREENBERG TRAURIG LLP

(57) ABSTRACT

Systems and methods for conducting person to person (P2P) transactions using points are disclosed. In one embodiment, in an information processing apparatus comprising at least one computer processor, a method for person-to-person reward points gifting may include: (1) receiving, from a bank customer, a request to issue a reward points gift to a gift recipient, the request identifying gift recipient contact information for the gift recipient and a reward points amount; (2) sending a notification to the gift recipient contact information for the gift recipient to log in a gift recipient account to redeem the reward points gift; and (3) transferring the reward points amount to a gift recipient reward points account.

12 Claims, 8 Drawing Sheets

(51) Int. Cl.
*G06Q 30/0226* (2023.01)
*G06Q 30/0235* (2023.01)
*G06Q 30/0207* (2023.01)
*G06Q 20/02* (2012.01)
*G06Q 20/04* (2012.01)
*G06Q 20/10* (2012.01)
*G06Q 20/20* (2012.01)
*G06Q 30/0238* (2023.01)
*G06Q 20/38* (2012.01)
*G06Q 20/40* (2012.01)
*G06F 16/9535* (2019.01)
*G06Q 20/34* (2012.01)

(52) U.S. Cl.
CPC ....... *G06Q 20/042* (2013.01); *G06Q 20/1085* (2013.01); *G06Q 20/202* (2013.01); *G06Q 20/342* (2013.01); *G06Q 20/385* (2013.01); *G06Q 20/4012* (2013.01); *G06Q 30/0215* (2013.01); *G06Q 30/0233* (2013.01); *G06Q 30/0235* (2013.01); *G06Q 30/0238* (2013.01); *G06Q 2220/00* (2013.01)

(56) References Cited

U.S. PATENT DOCUMENTS

| | | | | |
|---|---|---|---|---|
| 11,170,398 B1* | 11/2021 | Goldstein | ........... | G06Q 30/0228 |
| 2003/0200144 A1* | 10/2003 | Antonucci | ......... | G06Q 30/0226 |
| | | | | 705/14.28 |
| 2006/0163341 A1* | 7/2006 | Tulluri | ................... | G06Q 20/10 |
| | | | | 235/379 |
| 2007/0162338 A1* | 7/2007 | Lawe | ..................... | G06Q 30/02 |
| | | | | 705/14.38 |
| 2008/0172306 A1* | 7/2008 | Schorr | .................. | G06Q 30/02 |
| | | | | 705/26.8 |
| 2008/0195541 A1* | 8/2008 | Battaglini | ............. | G06Q 40/02 |
| | | | | 705/43 |
| 2009/0094118 A1* | 4/2009 | Antonucci | ......... | G06Q 30/0211 |
| | | | | 705/26.1 |
| 2010/0250436 A1* | 9/2010 | Loevenguth | ........... | G06Q 30/02 |
| | | | | 705/44 |
| 2011/0106698 A1* | 5/2011 | Isaacson | ................ | G06Q 30/02 |
| | | | | 705/41 |
| 2013/0024360 A1* | 1/2013 | Bailout | .................. | G06Q 20/40 |
| | | | | 705/39 |
| 2013/0144707 A1* | 6/2013 | Isaacson | ................ | G06Q 30/06 |
| | | | | 705/14.28 |
| 2013/0339124 A1* | 12/2013 | Postrel | ............... | G06Q 30/0233 |
| | | | | 705/14.33 |
| 2014/0250001 A1* | 9/2014 | Isaacson | ............. | G06Q 20/381 |
| | | | | 705/39 |
| 2014/0250002 A1* | 9/2014 | Isaacson | ........... | G06Q 30/0226 |
| | | | | 705/39 |
| 2015/0170183 A1* | 6/2015 | Santaella | ........... | G06Q 30/0226 |
| | | | | 705/14.27 |
| 2017/0206542 A1* | 7/2017 | Jana | ....................... | G06Q 20/10 |
| 2018/0150837 A1* | 5/2018 | Kirch | ................... | G06Q 20/387 |
| 2019/0318332 A1* | 10/2019 | Whelan | ................. | G06Q 20/34 |
| 2019/0392418 A1* | 12/2019 | Butler | .................. | G06Q 20/36 |
| 2020/0034840 A1* | 1/2020 | Bax | ....................... | G06Q 20/351 |
| 2020/0211124 A1* | 7/2020 | Bhagat | .................. | G06Q 50/01 |

FOREIGN PATENT DOCUMENTS

| | | | | | |
|---|---|---|---|---|---|
| WO | WO2019161404 | * | 8/2019 | ......... | G06Q 30/0215 |
| WO | WO-2019161404 A1 | * | 8/2019 | ........... | G06Q 20/027 |

OTHER PUBLICATIONS

Written Opinion of the International Searching Authority, Dec. 8, 2020, from corresponding International Application No. PCT/US2020/054203.

* cited by examiner

SYSTEMS AND METHODS FOR CONDUCTING PERSON TO PERSON TRANSACTIONS USING REWARD POINTS

RELATED APPLICATIONS

This application claims priority to, and the benefit of, U.S. Provisional Patent Application Ser. No. 62/924,916 filed Oct. 23, 2019, the disclosure of which is hereby incorporated, by reference, in its entirety.

BACKGROUND OF THE INVENTION

1. Field of the Invention

Embodiments generally relate to systems and methods for conducing person to person transactions using reward or loyalty points.

2. Description of the Related Art

Certain financial instruments reward their customers for purchases by issuing reward or loyalty points. These points can be redeemed for cash back, for experiences, and merchandise. Customers making person-to-person (P2P) payments using their digital wallets, however, can only make payments using currency transfer, charging a credit card, etc.

SUMMARY OF THE INVENTION

Systems and methods for conducting person to person (P2P) transactions using points are disclosed. In one embodiment, in an information processing apparatus comprising at least one computer processor, a method for person-to-person reward points gifting may include: (1) receiving, from a bank customer, a request to issue a reward points gift to a gift recipient, the request identifying gift recipient contact information for the gift recipient and a reward points amount; (2) sending a notification to the gift recipient contact information for the gift recipient to log in a gift recipient account to redeem the reward points gift; and (3) transferring the reward points amount to a gift recipient reward points account.

In one embodiment, the method may further include a time for issuing the reward points gift to the gift recipient.

In one embodiment, the contact information for the gift recipient may include a gift recipient email address, a gift recipient phone number, etc.

In one embodiment, the method may further include searching a plurality of customer profiles to identify a gift recipient customer profile using the gift recipient contact information; and creating the gift recipient reward points account in response to the gift recipient not having a customer profile.

In one embodiment, the reward points amount may be transferred to the gift recipient reward points account when the gift recipient logs on to the gift recipient reward points account.

According to another embodiment, in an information processing apparatus comprising at least one computer processor, a method for person-to-person gifting of a cash-equivalent gift using reward points may include: (1) receiving, from a bank customer, a request to issue cash-equivalent gift to a gift recipient based on reward points, the request identifying gift recipient contact information for the gift recipient and a reward points amount; (2) converting the reward points amount to the cash-equivalent gift; (3) sending a notification to the gift recipient contact information for the gift recipient to log in a gift recipient account to redeem the cash-equivalent gift; (4) transferring the cash-equivalent gift to a gift recipient account; and (5) debiting a reward point account for the bank customer for the reward points amount.

In one embodiment, the request may include a form of the cash-equivalent gift including a digital deposit, an automated clearing house (ACH) transfer, etc.

In another, the form of the cash-equivalent gift may include a paper check, an electronic or physical prepaid card, a merchant stored value card, etc., and the step of transferring the cash-equivalent gift to a gift recipient account may include causing the cash-equivalent gift to be sent to the gift recipient.

In one embodiment, the method may further include receiving, from the gift recipient, a form of the cash-equivalent gift comprising at least one a digital deposit and an ACH transfer.

In one embodiment, the method may further include receiving, from the gift recipient, a form of the cash-equivalent gift comprising at least one a paper check, an electronic or physical prepaid card, and a merchant stored value card;

wherein the step of transferring the cash-equivalent gift to a gift recipient account may include causing the cash-equivalent gift to be sent to the gift recipient.

In one embodiment, the request may further include a time for issuing the cash-equivalent gift to the gift recipient.

In one embodiment, the contact information for the gift recipient may include a gift recipient email address, a gift recipient phone number, etc.

In one embodiment, the method may further include searching a plurality of customer profiles to identify a gift recipient customer profile using the gift recipient contact information; and creating the gift recipient account in response to the gift recipient not having a customer profile.

According to another embodiment, in an information processing apparatus comprising at least one computer processor, a method for person-to-person gifting of a cash-equivalent gift using reward points may include: (1) receiving, from a bank customer, a request to issue cash-equivalent gift to a gift recipient based on reward points, the request identifying gift recipient contact information for the gift recipient and a reward points amount; (2) converting the reward points amount to the cash-equivalent gift; (3) creating a redemption code for the gift recipient to receive the cash-equivalent gift at a device in a network; (4) associating the redemption code with the cash-equivalent gift; (5) sending the redemption code to the gift recipient contact information to redeem the cash-equivalent gift; (6) receiving, from a device in the network, the redemption code; (7) authorizing the device to issue the cash-equivalent gift; and (8) debiting a reward point account for the bank customer for the reward points amount.

In one embodiment, the network may include automated teller machines and point of sale devices.

In one embodiment, the redemption code may include at least one of a machine-readable code, a personal identification number, and a one-time code.

In one embodiment, the request further may include a time for issuing the cash-equivalent gift to the gift recipient.

In one embodiment, the contact information for the gift recipient may include a gift recipient email address, a gift recipient phone number, etc.

In one embodiment, the method may further include searching a plurality of customer profiles to identify a gift recipient customer profile using the gift recipient contact information; and creating the gift recipient account in response to the gift recipient not having a customer profile.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
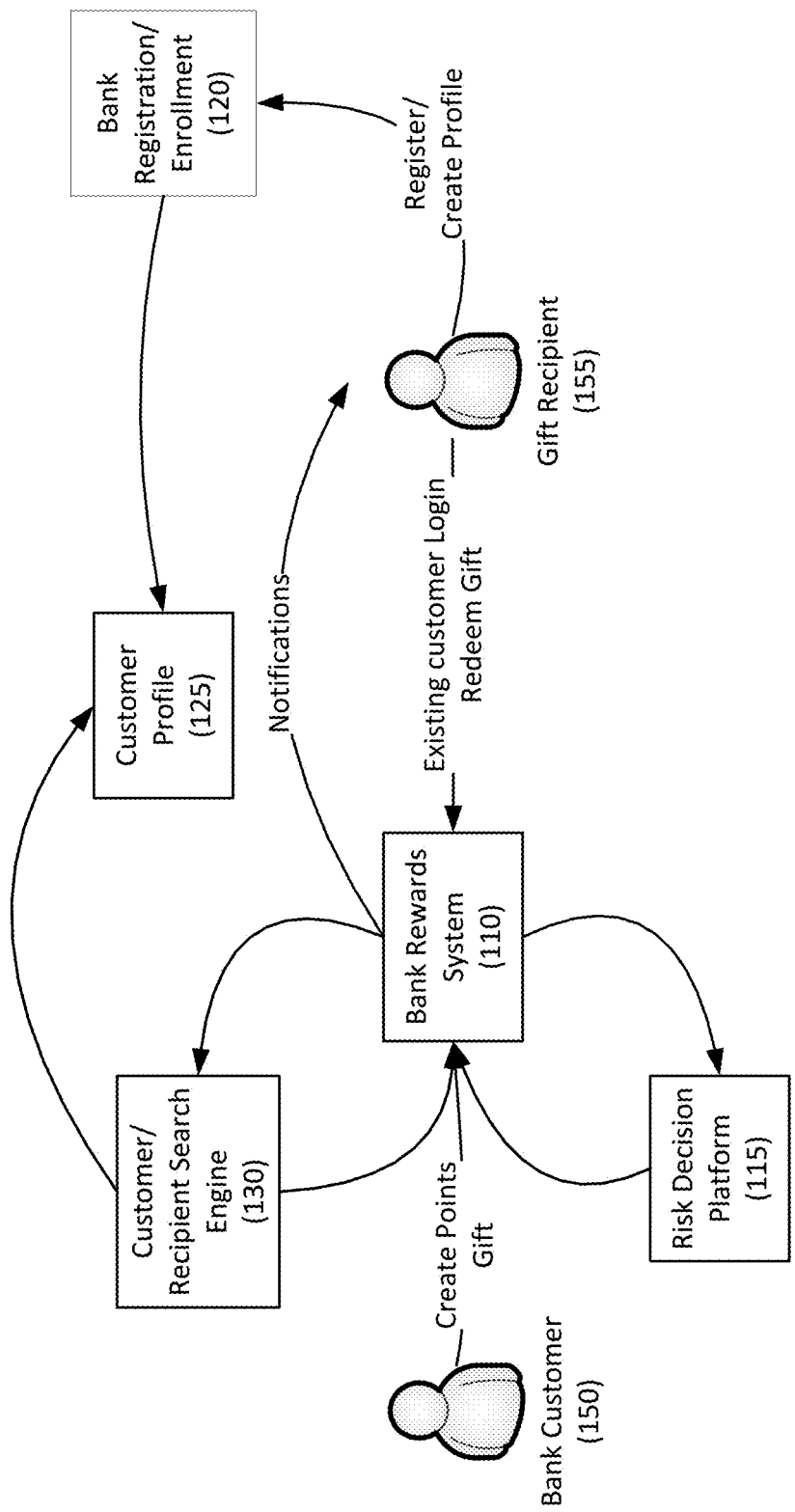
FIG. 1 depicts a system for P2P reward points gifting according to one embodiment.

Embodiments generally relate to systems and methods for P2P payments using points, such as loyalty points, reward points, or an alternative currency.

Embodiments may include the following:

Bank Rewards System (110): This system may include records of rewards points, product configurations, rewards configurations and user experiences for managing rewards related actions.

Risk Decision Platform (115): This system may include a configurable set of rules and execution of rules related to detecting risk and preventing fraud in relation to actions executed within bank rewards system 110 by both bank customer 150 and gift recipient 155.

Bank Registration/Enrollment System (120): This system may manage non-bank customer enrollment (e.g., customer profile creation) and registration related to the specific allowable actions contained within bank rewards system 110 such as choosing a gift option or redeeming reward points.

Customer Profile System (125): This system may include demographic information related to bank and non-bank customers that may be used for "Know Your Customer" (KYC) screening, Anti-Money Laundering (AML) screening, logging in for redemptions, searching for gift recipient 155's, housing or linking to contact information (e.g., email, cell phone, address, etc.).

Customer/Recipient Search Engine (130): This engine may manage the ability for bank customers 150 to search for gift recipients 155 among known bank and non-bank customers in addition to entering preliminary profile information for new gift recipients 155 not found within customer profile system 125.

Points to Gift Conversion Rate Rules Engine (135): This system may include a configurable set of rules that determines the value of each point in relation to a specific redemption option and is used by the bank rewards system 110.

Enrolled Merchants (Stored Value) System (140): This system may include a configurable set of merchant listings that are participating in merchant stored value redemption options including, but not limited to reward points conversion rates and eligibility.

Bank Account System of Record (SOR) (145): This system may include the internal financial account system of record that can be, but is not limited to a Direct Deposit Account (DDA) or a Credit Card platform.

Bank Customer (150): This is an existing customer of the bank that owns the reward points and is typically the entity that creates the gift.

Gift Recipient (155): This is an existing customer or non-customer of the bank that is the recipient of the gift chosen by the bank customer 150.

Referring to FIG. 1, a system and method for P2P reward points gifting is disclosed according to one embodiment. In embodiments, bank customer 150 may create a gift of points (e.g., reward points, loyalty points, etc.) to give to gift recipient 155. In one embodiment, bank customer 150 may search for gift recipient 155 using customer/recipient search engine 130 and customer profile 125 using, for example, gift recipient's name, handle, account number, phone number, email address, etc. In another embodiment, bank customer may enter contact information for gift recipient 155, and bank rewards system 110 may identify gift recipient using customer recipient search engine 130 and customer profile 125.

If gift recipient 155 is not registered, bank rewards system 110 may provide a notification to gift recipient 155 of the gift with directions on how to redeem the gift by, for example, creating a profile with bank registration/enrollment system 120.

Gift recipient 155 may log into an existing profile using bank registration/enrollment system 120, and may redeem reward points on bank rewards system 110 for eligible items.

Figure 2:
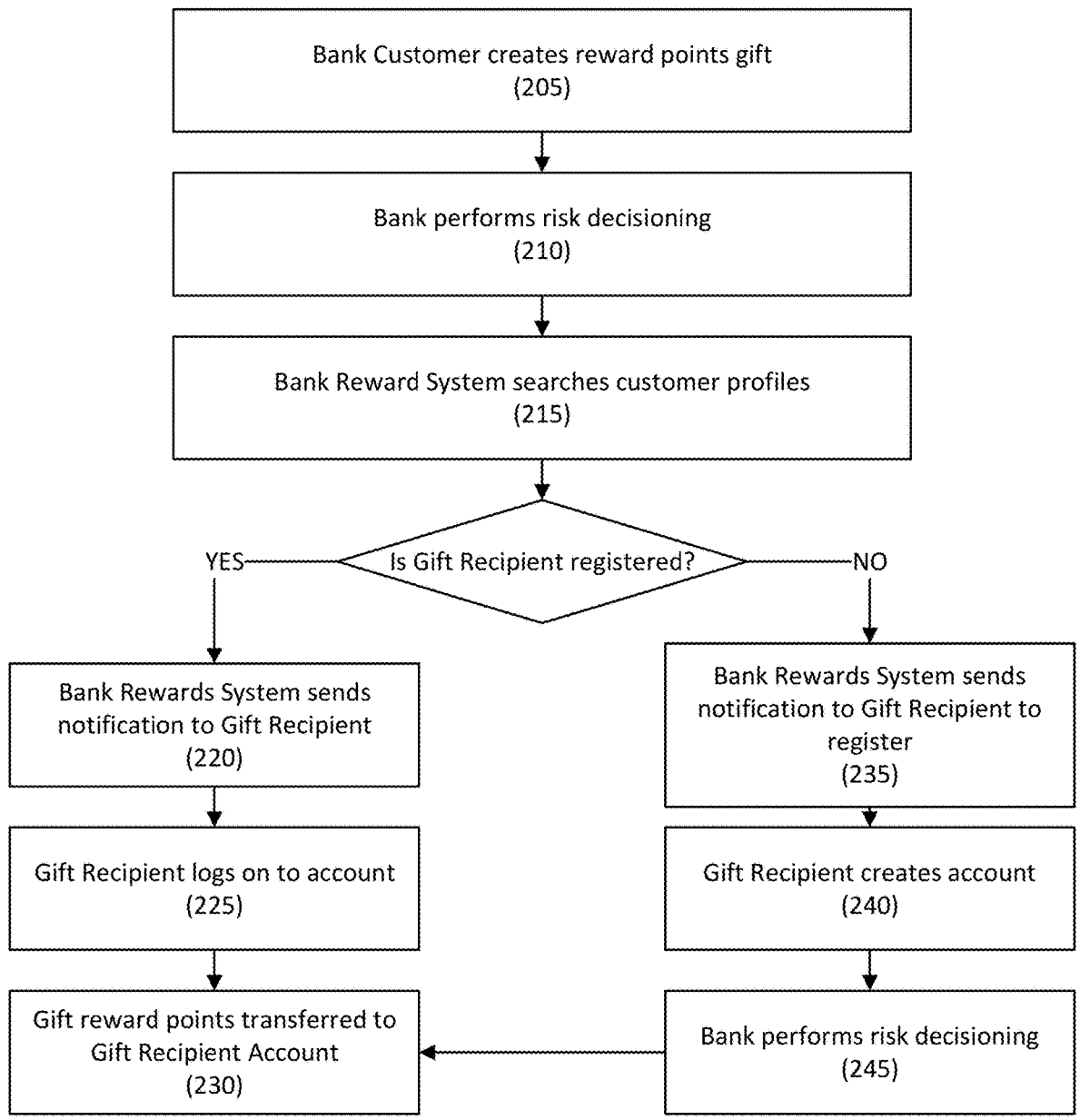
FIG. 2 depicts a method for P2P reward points gifting according to one embodiment.

Referring to FIG. 2, a method for P2P reward points gifting is disclosed according to an embodiment such as that of FIG. 1.

In step 205, the bank customer may create a reward points gift using an interface at a bank rewards system. In one embodiment, the reward points gift may identify a gift recipient, an amount of reward points, a delivery time/date for the gift, etc. In one embodiment, the bank customer may provide contact information for the gift recipient, such as an email, phone number, etc.

In step 210, the bank may perform risk decisioning on the gift, such as applying KYC and/or AML standards, etc.

In step 215, the bank rewards system may search customer profiles to determine if the gift recipient is registered as an existing customer of the bank, or as having a rewards account with the bank.

If the gift recipient is registered, in step 220, the bank rewards system may send a notification to the gift recipient requesting that the gift recipient log in to the gift recipient's account to redeem the gift reward points.

In step 225, the gift recipient may log in to the gift recipient's account.

In step 230, the gift reward points may be transferred to the gift recipient. In one embodiment, the gift reward points may be transferred when the gift recipient logs in. In another embodiment, the gift reward points may be transferred when the gift recipient is identified as an existing customer of the bank, or as having a rewards account with the bank.

If the gift recipient is not a customer of the bank, or does not have a rewards account with the bank, in step 235, the bank rewards system may send a notification to the gift recipient requesting that the gift recipient enroll or create a rewards account with the bank in order to redeem the gift reward points.

In step 240, the gift recipient may create an account and may complete a customer profile. In step 245, the bank may perform risk decisioning on the gift recipient, such as applying KYC and/or AML standards, etc.

The process may continue with the gift reward points being transferred to the gift recipient in step 230.

Figure 3:
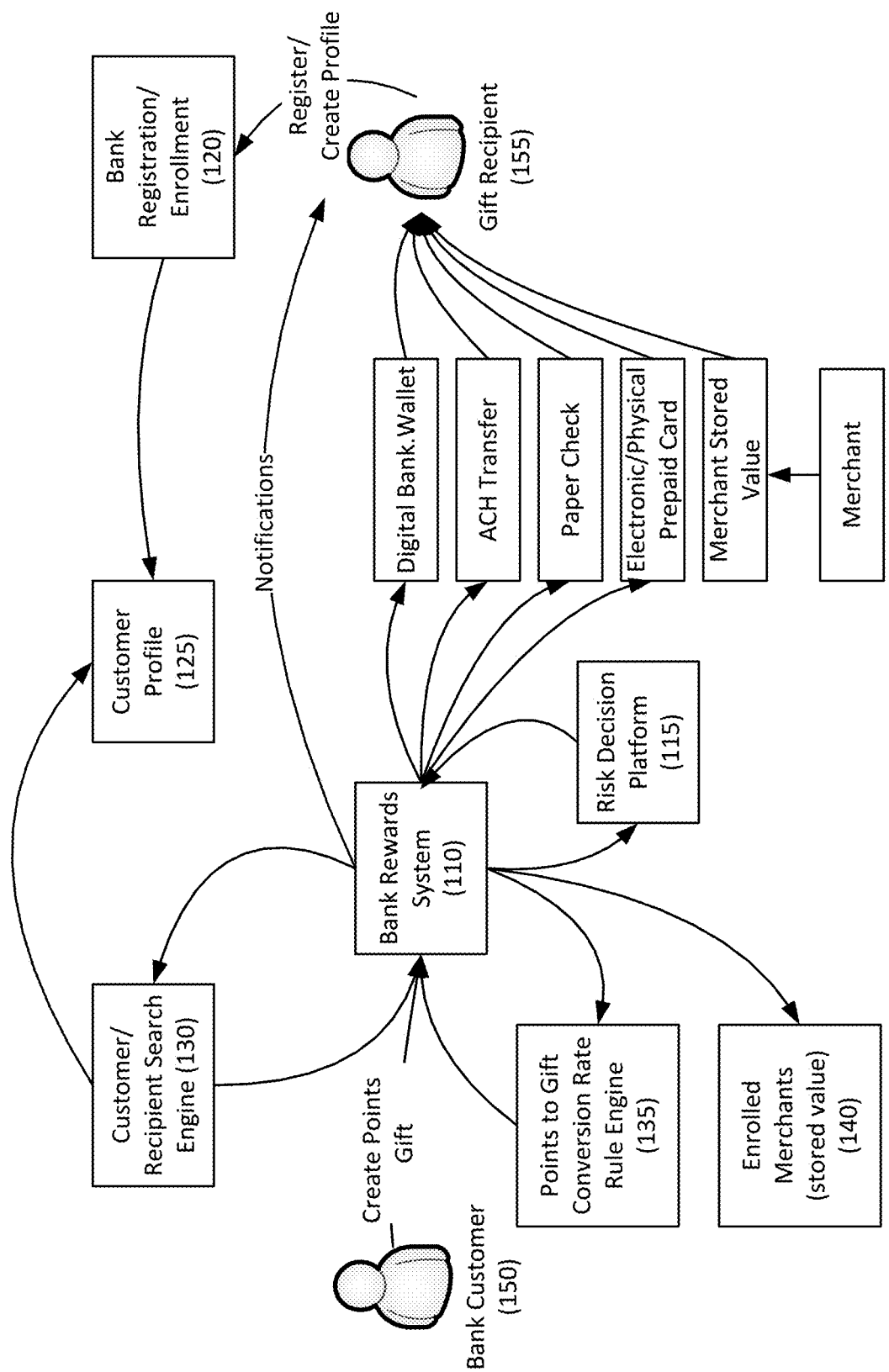
FIG. 3 depicts a system for P2P cash-equivalent gifting using reward points according to one embodiment.

Referring to FIG. 3, a system for P2P cash-equivalent gifting using reward points is disclosed according to one embodiment. In this embodiment, bank customer 150 may create a cash equivalent gift for gift recipient 155 to redeem. The cash equivalent may be presented in several forms, such as a digital deposit, automated clearing house (ACH) transfer, paper check, electronic or physical prepaid card, merchant stored value card, etc. Each form may have a specific point to dollar conversion rate, which may be determined by reward points to gift conversion rate rules engine 135, and bank customer 150 may be provided with the value of each form. In this embodiment, bank customer 150 may choose which gift to send to gift recipient 155.

Figure 4:
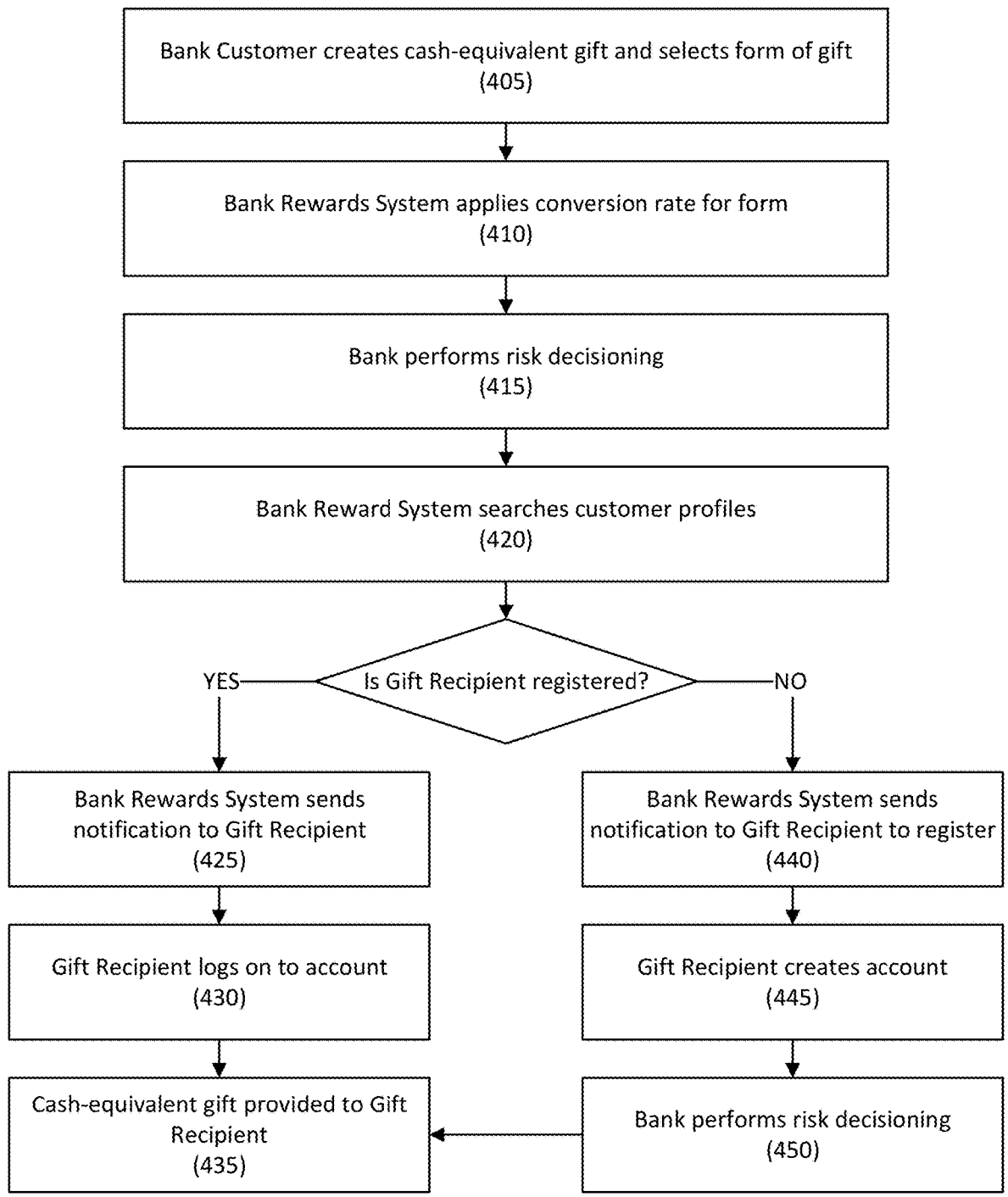
FIG. 4 depicts a method for P2P cash-equivalent gifting using reward points according to one embodiment.

Referring to FIG. 4, a method for P2P cash-equivalent gifting using reward points is disclosed according to an embodiment such as that of FIG. 3.

In step 405, the bank customer may create a cash-equivalent gift using an interface at a bank rewards system. In one embodiment, the cash-equivalent gift may identify a gift recipient, the form of the cash-equivalent gift, such as a digital deposit, ACH transfer, paper check, electronic or physical prepaid card, merchant stored value card, etc., the value of the gift based on the reward points to dollar conversion rate for the form, a delivery time/date for the cash-equivalent gift, etc. In one embodiment, the bank customer may provide contact information for the gift recipient, such as an email, phone number, etc.

In step 410, the bank rewards system may apply the conversion rate to the reward points for the form of gift.

In step 415, the bank may perform risk decisioning on the cash-equivalent gift, such as applying KYC and/or AML standards, etc.

In step 420, the bank rewards system may search customer profiles to determine if the gift recipient is registered as an existing customer of the bank, or as having a rewards account with the bank.

If the gift recipient is registered, in step 425, the bank rewards system may send a notification to the gift recipient requesting that the gift recipient log in to the gift recipient's account to redeem the gift reward points.

In one embodiment, the gift recipient may not need to log in to an account.

In step 430, the gift recipient may log in the gift recipient's account.

In step 435, the cash-equivalent gift may be provided in the requested form.

If the gift recipient is not a customer of the bank, or does not have a rewards account with the bank, in step 440, the bank rewards system may send a notification to the gift recipient requesting that the gift recipient enroll or create a rewards account with the bank in order to redeem the cash-equivalent gift.

In step 445, the gift recipient may create an account and may complete a customer profile. In step 450, the Bank may perform risk decisioning on the gift recipient, such as applying KYC or AML standards, etc. The process may continue with the cash-equivalent gift being transferred to the gift recipient in the requested form in step 435.

Figure 5:
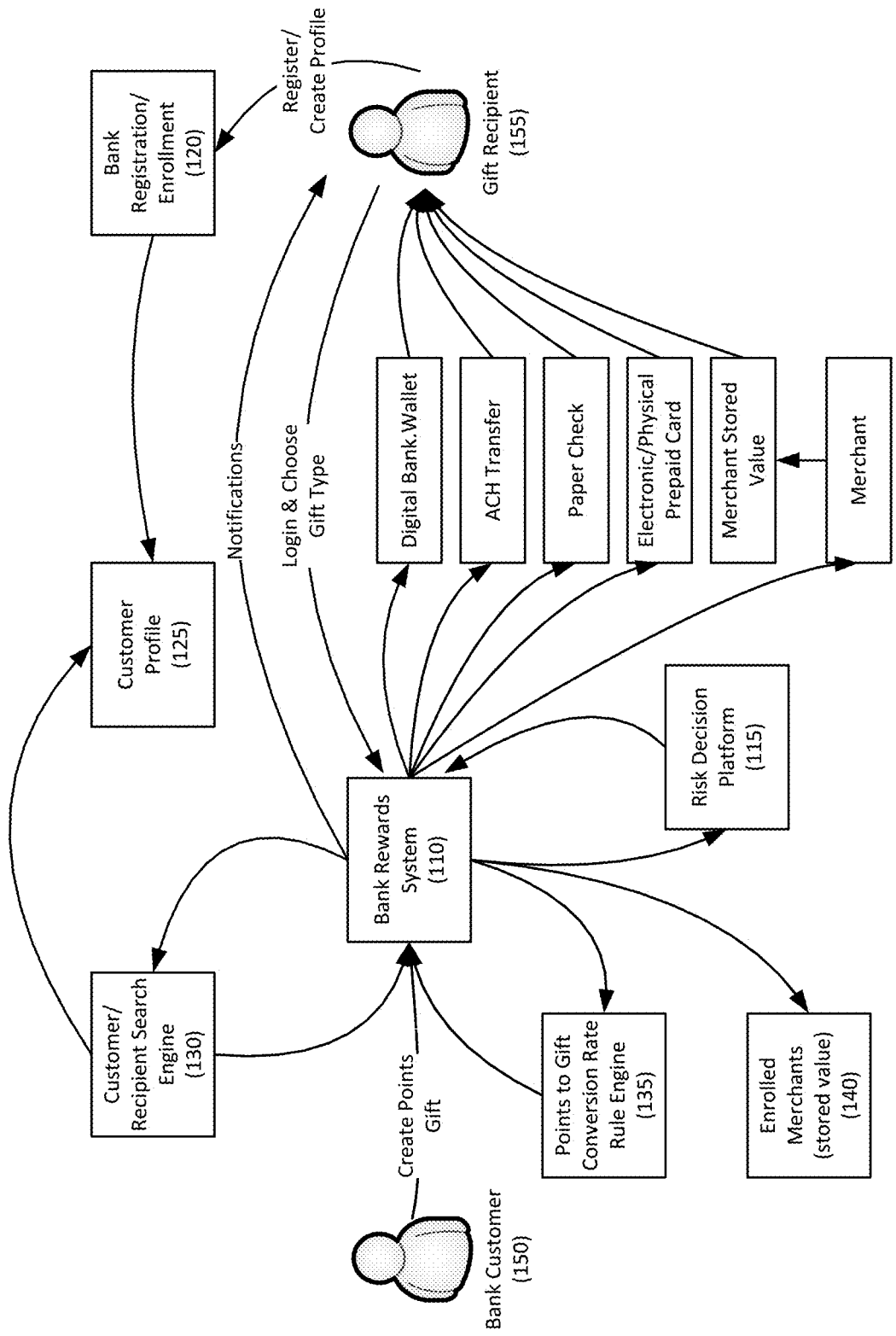
FIG. 5 depicts a system for P2P cash-equivalent gifting using reward points according to another embodiment.

Referring to FIG. 5, a system for P2P cash-equivalent gifting using reward points is disclosed according to another embodiment. In this embodiment, bank customer 150 may create a cash equivalent gift for gift recipient 155, and gift recipient 155 may select the form for redemption.

Figure 6:
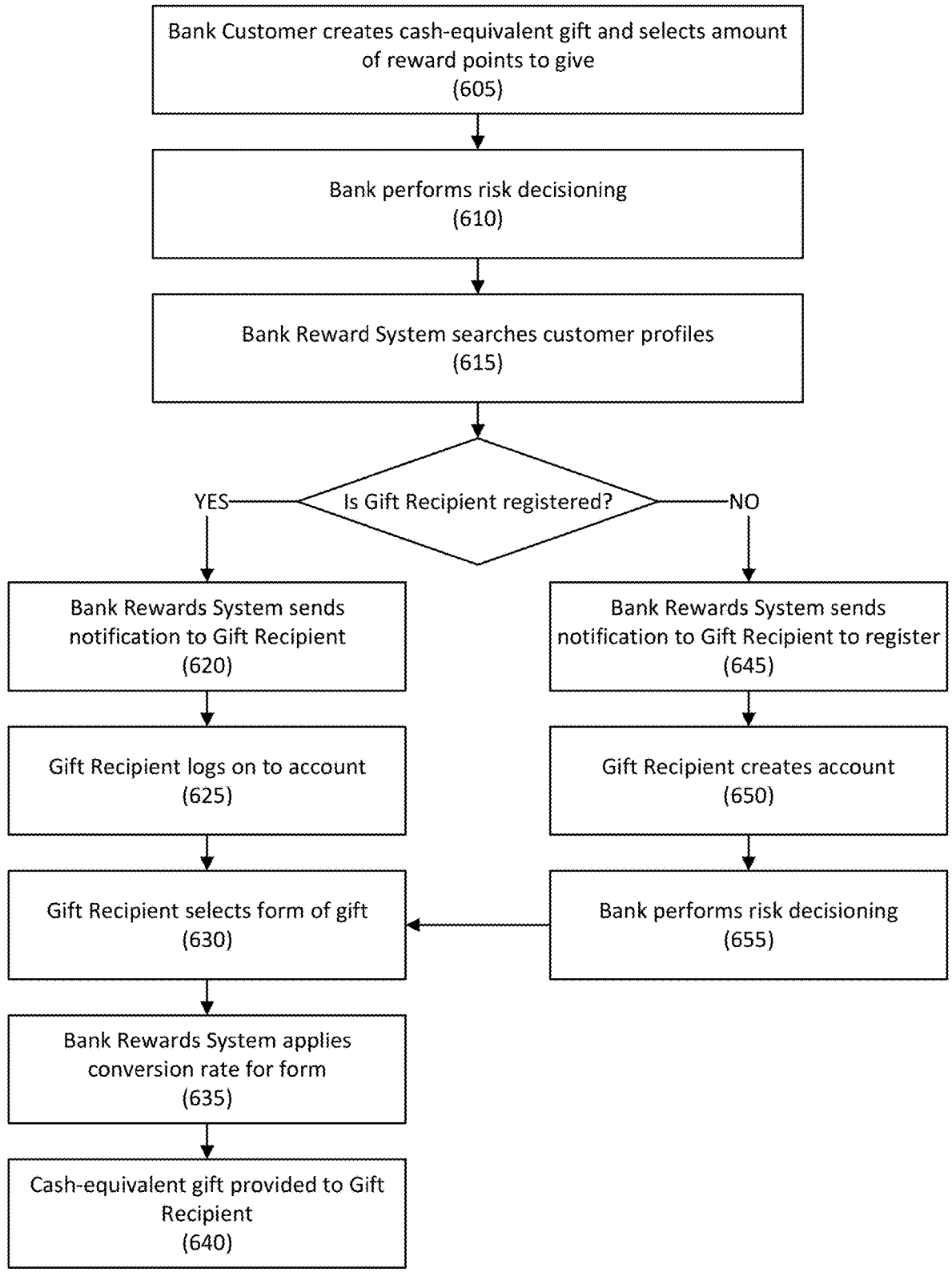
FIG. 6 depicts a method for P2P cash-equivalent gifting using reward points according to another embodiment.

Referring to FIG. 6, a method for P2P cash-equivalent gifting using reward points is disclosed according to an embodiment such as that of FIG. 5.

In step 605, the bank customer may create a cash-equivalent gift using an interface at a bank rewards system. In one embodiment, the cash-equivalent gift may identify a gift recipient, an amount of reward points to give for a cash equivalent gift, a delivery time/date for the cash-equivalent gift, etc. In one embodiment, the bank customer may provide contact information for the gift recipient, such as an email, phone number, etc.

In step 610, the bank may perform risk decisioning on the cash-equivalent gift, such as applying KYC and/or AML standards, etc.

In step 615, the bank rewards system may search customer profiles to determine if the gift recipient is registered as an existing customer of the bank, or as having a rewards account with the bank.

If the gift recipient is registered, in step 620, the bank rewards system may send a notification to the gift recipient requesting that the gift recipient log in to the gift recipient's account to redeem the gift reward points.

In one embodiment, the gift recipient may not need to log into an account.

In step 625, the gift recipient may log in the gift recipient's account.

In step 630, the gift recipient may select the form of the cash-equivalent gift (e.g., digital deposit, ACH transfer, paper check, electronic or physical prepaid card, merchant stored value card, etc.). Each form may have a specific point to dollar conversion rate, and the gift recipient may be provided with the value of each form.

In step 635, the bank rewards system may apply the conversion rate to the reward points for the form of gift.

In step 640, the cash-equivalent gift may be provided in the requested form.

If the gift recipient is not a customer of the bank, or does not have a rewards account with the bank, in step 645, the bank rewards system may send a notification to the gift recipient requesting that the gift recipient enroll or create a rewards account with the bank in order to redeem the cash-equivalent gift.

In step 650, the gift recipient may create an account and may complete a customer profile. In step 655, the bank may perform risk decisioning on the gift recipient, such as applying KYC or AML standards, etc. If the gift recipient is approved, the process may continue with the gift recipient selecting the form of the gift in step 630, the bank rewards system may apply the conversion rate to the reward points for the form of gift in step 635, and the cash-equivalent gift being provided in the requested form in step 640.

Figure 7:
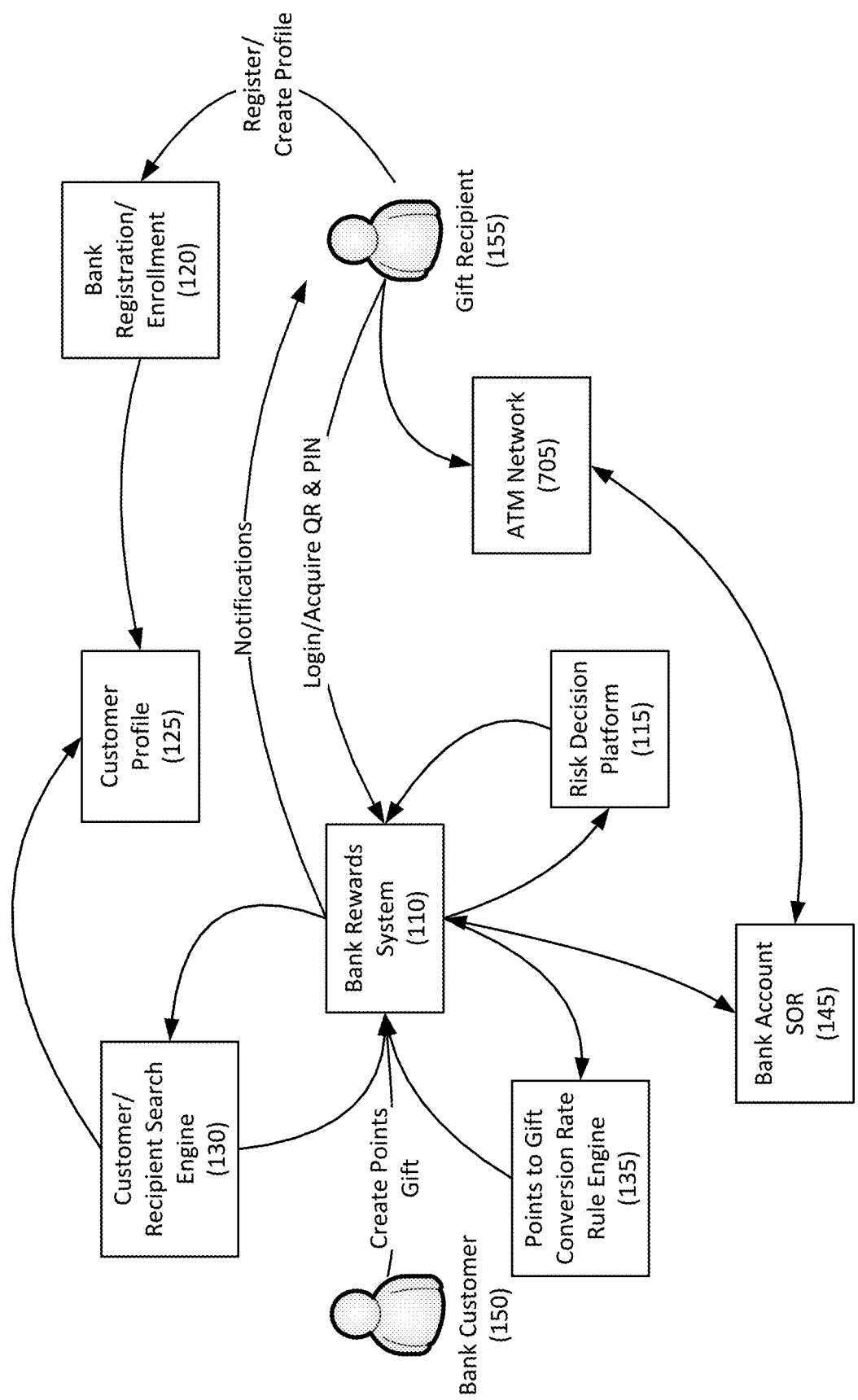
FIG. 7 depicts a system for P2P cash-equivalent gifting using reward points according to another embodiment.

Referring to FIG. 7, a system for P2P cash-equivalent gifting using reward points is disclosed according to another embodiment. In this embodiment, bank customer 150 may create a cash gift for gift recipient 155 to through ATM network 705. Gift recipient 155 may create a profile or log into an existing profile to acquire a redemption code, such as a QR code and PIN, a one-time code, etc. for authenticating to ATM network 705 for withdrawing cash. ATM network 705 may include automated teller machines (ATMs), point of sale devices at merchant locations, etc. Bank rewards system 110 may create a payment instruction and associate that with the redemption code so that only the amount specified by bank customer 150 can be withdrawn by gift recipient 155. Embodiments may use fraud and risk strategies to prevent fraud and disallow gift recipient 155 to withdraw amounts other than the amount specified by bank customer 150.

Figure 8:
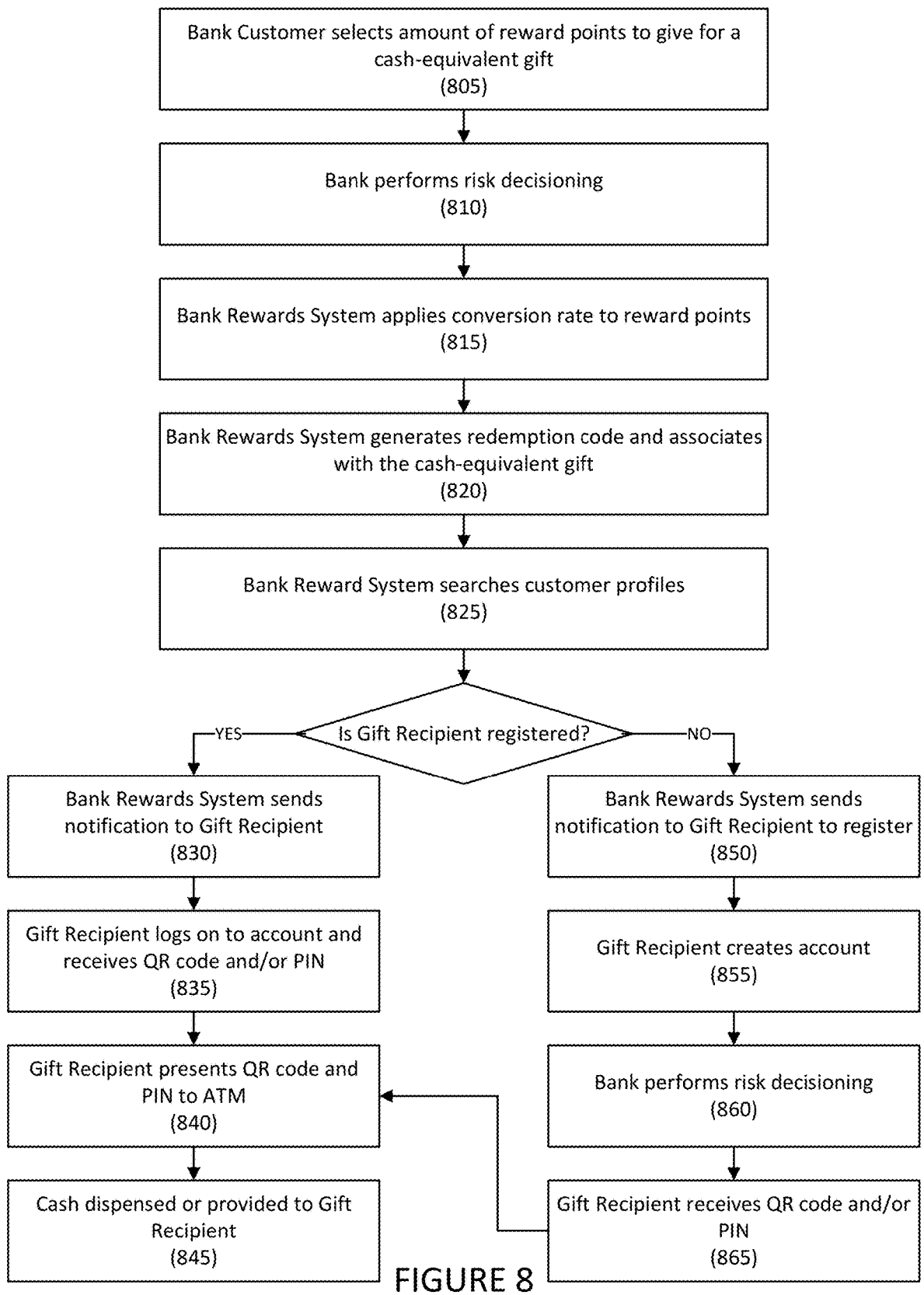
FIG. 8 depicts a method for P2P cash-equivalent gifting using reward points according to another embodiment.

Referring to FIG. 8, a method for a method for P2P cash-equivalent gifting using reward points is disclosed according to an embodiment such as that of FIG. 7.

In step 805, the bank customer may create a reward points gift using an interface at a bank rewards system. In one embodiment, the reward points gift may identify a gift recipient, an amount of reward points, a delivery time/date for the gift, etc. In one embodiment, the bank customer may provide contact information for the gift recipient, such as an email, phone number, etc.

In one embodiment, the bank customer may be presented with the cash equivalent for the selected reward points.

In step 810, the bank may perform risk decisioning on the gift, such as applying KYC and/or AML standards, etc.

In step 815, bank rewards system may apply the conversion rate to the reward points.

In step 820, the bank rewards system may generate a redemption code, such as a machine-readable code (e.g., a QR code), a PIN, a one-time code, etc. to redeem the cash-equivalent gift, and may associate the redemption code with the cash-equivalent gift.

In step 825, the bank rewards system may search customer profiles to determine if the gift recipient is registered as an existing customer of the bank, or as having a rewards account with the bank.

If the gift recipient is registered, in step 830, the bank rewards system may send a notification to the gift recipient requesting that the gift recipient log in to the gift recipient's account to redeem the gift reward points.

In step 835, the gift recipient may log in to the gift recipient's account to receive the redemption code to withdraw the cash gift.

In one embodiment, the bank rewards system may also send the redemption code to the gift recipient without the gift recipient logging in.

In step 840, the gift recipient may approach an ATM in the ATM network, a participating point of sale device, etc. and may present the redemption code and may enter the PIN.

In step 845, the cash may be dispensed to the gift recipient.

If the gift recipient is not a customer of the bank, or does not have a rewards account with the bank, in step 850, the bank rewards system may send a notification to the gift recipient requesting that the gift recipient enroll or create a rewards account with the bank in order to redeem the gift reward points.

In step 855, the gift recipient may create an account and may complete a customer profile. In step 860, the bank may perform risk decisioning on the gift recipient, such as applying KYC and/or AML standards, etc.

In step 865, the gift recipient may be provided with the redemption code and/or PIN to withdraw the cash gift.

In one embodiment, the bank rewards system may also send the redemption code and/or PIN to the gift recipient without the gift recipient creating an account.

The process may continue with the gift recipient approaching an ATM in the ATM network and presenting the redemption code and may enter the PIN in step 840, and cash being dispensed to the gift recipient in step 845.

The disclosure of U.S. Provisional Patent Application Ser. No. 62/748,094 is hereby incorporated, by reference, in its entirety.

Although several embodiments have been disclosed, these embodiments are not exclusive to each other and features and elements in one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for person-to-person gifting of a cash-equivalent gift using reward points, comprising:
   receiving, by a computer program executed by a financial institution backend and from an electronic device associated with a bank customer, a request to issue a cash-equivalent gift to a gift recipient based on reward points, the request identifying gift recipient contact information for the gift recipient and comprising a reward points amount and a date and time to send a notification of the cash-equivalent gift to the gift recipient;
   converting, by the computer program, the reward points amount to the cash-equivalent gift;
   creating, by the computer program, a redemption code for the gift recipient to receive the cash-equivalent gift at an Automated Teller Machine (ATM) or a point of sale device in an ATM network;
   associating, by the computer program, the redemption code with the cash-equivalent gift;
   sending, by the computer program, the notification comprising the redemption code to an electronic device associated with the gift recipient using the gift recipient contact information to redeem the cash-equivalent gift at the date and time in the request;
   receiving, by the computer program and from the ATM or the point of sale device in the ATM network, the redemption code;
   instructing, by the computer program, the ATM or the point of sale device to issue the cash-equivalent gift; and
   debiting, by the computer program, a reward point account for the bank customer for the reward points amount after authorizing the device to issue the cash-equivalent gift.

2. The method of claim 1, wherein the redemption code comprises at least one of a machine readable code, a personal identification number, and a one-time code.

3. The method of claim 1, wherein the gift recipient contact information comprises at least one of a gift recipient email address and a gift recipient phone number.

4. The method of claim 1, further comprising:
   searching a plurality of customer profiles to identify a gift recipient customer profile using the gift recipient contact information; and
   creating a gift recipient account in response to the gift recipient not having a customer profile.

5. A system, comprising:
   a bank customer electronic device associated with a bank customer;
   a gift recipient electronic device associated with a gift recipient;
   an Automated Teller Machine (ATM) network comprising a plurality of ATMs or point of sale devices; and
   a financial institution backend executing a computer program that receives, from the bank customer electronic device, a request to issue a cash-equivalent gift to the gift recipient based on reward points, the request identifying gift recipient contact information for the gift recipient and comprising a reward points amount and a date and time to send a notification of the cash-equivalent gift to the gift recipient, converts the reward points amount to the cash-equivalent gift, creates a redemption code for the gift recipient to receive the cash-equivalent gift at one of the ATMs or the point of sale devices in the ATM network; associates the redemption code with the cash-equivalent gift, sends the notification comprising the redemption code to the gift recipient electronic device using the gift recipient contact information to redeem the cash-equivalent gift at the date and time in the request, receives, from the ATM or the point of sale device in the ATM network, the redemption code, instructs the ATM or the point of sale device to issue the cash-equivalent gift, and debits a reward point account for the bank customer for the reward points amount after authorizing the device to issue the cash-equivalent gift.

6. The system of claim 5, wherein the redemption code comprises at least one of a machine readable code, a personal identification number, and a one-time code.

7. The system of claim 5, wherein the gift recipient contact information comprises at least one of a gift recipient email address and a gift recipient phone number.

8. The system of claim 5, wherein the computer program searches a plurality of customer profiles to identify a gift recipient customer profile using the gift recipient contact information and creates a gift recipient account in response to the gift recipient not having a customer profile.

9. A non-transitory computer readable storage medium, including instructions stored thereon, which when read and executed by one or more computer processors, cause the one or more computer processors to perform steps comprising:
   receiving, from a bank customer electronic device, a request to issue a cash-equivalent gift to a gift recipient based on reward points, the request identifying gift recipient contact information for the gift recipient and comprising a reward points amount and a date and time to send a notification of the cash-equivalent gift to the gift recipient;
   converting the reward points amount to the cash-equivalent gift, creates a redemption code for the gift recipient to receive the cash-equivalent gift at one of an Automated Teller Machine (ATM) or a point of sale devices in an ATM network;

associating the redemption code with the cash-equivalent gift, sends the notification comprising the redemption code to a gift recipient electronic device using the gift recipient contact information to redeem the cash-equivalent gift at the date and time in the request;

receiving, from the ATM or the point of sale device in the ATM network, the redemption code;

instructing the ATM or the point of sale device to issue the cash-equivalent gift; and debiting a reward point account for the bank customer for the reward points amount after authorizing the device to issue the cash-equivalent gift.

10. The non-transitory computer readable storage medium of claim 9, wherein the redemption code comprises at least one of a machine readable code, a personal identification number, and a one-time code.

11. The non-transitory computer readable storage medium of claim 9, wherein the gift recipient contact information comprises at least one of a gift recipient email address and a gift recipient phone number.

12. The non-transitory computer readable storage medium of claim 9, further including instructions stored thereon, which when read and executed by one or more computer processors, cause the one or more computer processors to perform steps comprising:

searching a plurality of customer profiles to identify a gift recipient customer profile using the gift recipient contact information; and creating a gift recipient account in response to the gift recipient not having a customer profile.

* * * * *